(12) United States Patent
Dubé et al.

(10) Patent No.: US 9,046,242 B2
(45) Date of Patent: Jun. 2, 2015

(54) LIGHT DISPERSION DEVICE

(75) Inventors: Jean-Guy Dubé, St-Pie (CA); Jean Morin, Trois-Rivières (CA); Camille Chagnon, Varennes (CA); Richard Lang, Lasalle (CA)

(73) Assignee: Groupe Ledel Inc., Varennes, Quebec (CA)

( * ) Notice: Subject to any disclaimer, the term of this patent is extended or adjusted under 35 U.S.C. 154(b) by 284 days.

(21) Appl. No.: 13/571,995

(22) Filed: Aug. 10, 2012

(65) Prior Publication Data

US 2014/0043813 A1    Feb. 13, 2014

(51) Int. Cl.
| F21V 5/00 | (2006.01) |
| F21V 5/04 | (2006.01) |
| G02F 1/1335 | (2006.01) |
| F21Y 105/00 | (2006.01) |
| F21Y 101/02 | (2006.01) |

(52) U.S. Cl.
CPC ....... *F21V 5/04* (2013.01); *G02F 2001/133607* (2013.01); *F21Y 2105/001* (2013.01); *F21V 5/008* (2013.01); *F21Y 2101/02* (2013.01)

(58) Field of Classification Search
CPC .............. F21Y 2105/001; F21V 5/008; G02F 2001/133607
USPC .......................... 362/236, 244, 330–333, 339
See application file for complete search history.

(56) References Cited

U.S. PATENT DOCUMENTS

| 5,592,578 | A | 1/1997 | Ruh |
| 6,547,423 | B2 | 4/2003 | Marshall et al. |
| 6,825,983 | B2 | 11/2004 | Bourdelais et al. |
| 7,084,435 | B2 | 8/2006 | Sugimoto et al. |
| 7,224,537 | B2 | 5/2007 | Choi |
| 7,329,982 | B2 | 2/2008 | Conner et al. |
| 7,445,361 | B1 | 11/2008 | Hsu et al. |
| 7,623,293 | B2 | 11/2009 | Yao et al. |
| 7,753,565 | B2 | 7/2010 | Hsu et al. |
| 7,789,538 | B2 | 9/2010 | Epstein et al. |
| 7,826,152 | B2 | 11/2010 | Inoue |
| 7,830,629 | B2 | 11/2010 | Chang |
| 7,839,062 | B2 | 11/2010 | Shum |
| 7,871,172 | B2 | 1/2011 | Chang |
| 7,988,328 | B2 | 8/2011 | Cheng et al. |
| 7,989,836 | B2 | 8/2011 | Uemura |

(Continued)

FOREIGN PATENT DOCUMENTS

| EP | 1 255 132 | 11/2002 |
| EP | 1 255 132 | 8/2005 |

(Continued)

*Primary Examiner* — Sean Gramling
(74) *Attorney, Agent, or Firm* — Sunstein Kann Murphy & Timbers LLP

(57) ABSTRACT

A light dispersion device for providing a predictable lighting pattern comprising a Light Emitting Diode (LED) source and a lens. The lens comprising a first optical element for collecting light emitted by the LED source and refracting light into an intermediate lighting pattern, and a second optical element for collecting at least light refracted in the intermediate lighting pattern and refracting light into the predictable lighting pattern.

A lens comprising a first optical element for collecting light emitted by a source of light and refracting light into an intermediate lighting pattern, and a second optical element for collecting at least light refracted in the intermediate lighting pattern and refracting light into the predictable lighting pattern.

4 Claims, 8 Drawing Sheets

(56) References Cited

U.S. PATENT DOCUMENTS

| | | |
|---|---|---|
| 8,042,975 B2 | 10/2011 | Shyu et al. |
| 8,076,831 B2 | 12/2011 | Shum |
| 2003/0170442 A1 | 9/2003 | Kaminsky et al. |
| 2006/0238884 A1 | 10/2006 | Jang et al. |
| 2007/0024990 A1 | 2/2007 | Paek et al. |
| 2007/0035940 A1* | 2/2007 | Yao et al. ................. 362/29 |
| 2007/0102721 A1 | 5/2007 | Denbaars et al. |
| 2007/0171186 A1 | 7/2007 | Chang et al. |
| 2007/0201246 A1 | 8/2007 | Yeo et al. |
| 2008/0067531 A1 | 3/2008 | Chang |
| 2008/0239204 A1 | 10/2008 | Lee et al. |
| 2008/0258040 A1 | 10/2008 | Sun et al. |
| 2009/0021667 A1 | 1/2009 | Horiguchi et al. |
| 2009/0025427 A1 | 1/2009 | Lee et al. |
| 2009/0167788 A1 | 7/2009 | Lin et al. |
| 2009/0201665 A1* | 8/2009 | Goto ...................... 362/97.1 |
| 2009/0214126 A1 | 8/2009 | Ou-Yang et al. |
| 2009/0272990 A1 | 11/2009 | Ho et al. |
| 2009/0273289 A1 | 11/2009 | Hsu et al. |
| 2009/0275257 A1 | 11/2009 | Lee et al. |
| 2009/0279053 A1 | 11/2009 | Ho et al. |
| 2009/0303560 A1 | 12/2009 | Sun et al. |
| 2009/0322026 A1 | 12/2009 | Ho et al. |
| 2010/0055813 A1 | 3/2010 | Lee et al. |
| 2010/0165649 A1 | 7/2010 | Sun et al. |
| 2010/0259803 A1 | 10/2010 | Hsieh et al. |
| 2010/0284254 A1 | 11/2010 | Sun et al. |
| 2010/0296296 A1 | 11/2010 | Sun et al. |
| 2010/0309768 A1 | 12/2010 | Sun et al. |
| 2011/0019424 A1 | 1/2011 | Sun |
| 2011/0042700 A1 | 2/2011 | Lenk |
| 2011/0234954 A1 | 9/2011 | Hsu et al. |
| 2011/0235493 A1 | 9/2011 | Sun et al. |
| 2011/0249308 A1 | 10/2011 | Sun et al. |
| 2011/0249544 A1 | 10/2011 | Sun et al. |
| 2012/0038890 A1 | 2/2012 | Sun et al. |
| 2012/0075870 A1 | 3/2012 | Kayanuma |
| 2013/0003002 A1 | 1/2013 | Hsu et al. |
| 2013/0051031 A1 | 2/2013 | Sun et al. |
| 2013/0069522 A1 | 3/2013 | Sun et al. |
| 2013/0100280 A1 | 4/2013 | Sun et al. |
| 2013/0100512 A1 | 4/2013 | Sun et al. |
| 2013/0107372 A1 | 5/2013 | Sun et al. |
| 2013/0107512 A1 | 5/2013 | Sun et al. |

FOREIGN PATENT DOCUMENTS

| | | |
|---|---|---|
| WO | WO 2007/078977 | 7/2007 |
| WO | WO 2009/114076 | 9/2009 |

* cited by examiner

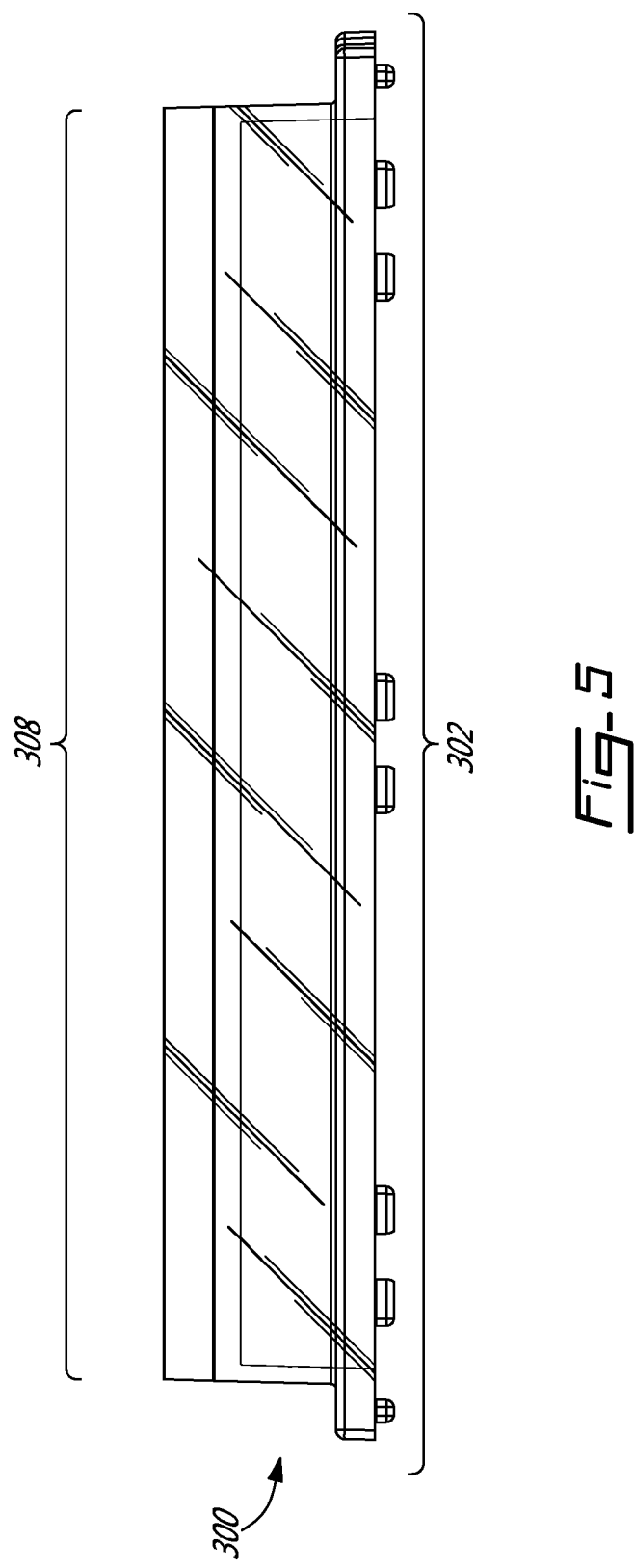

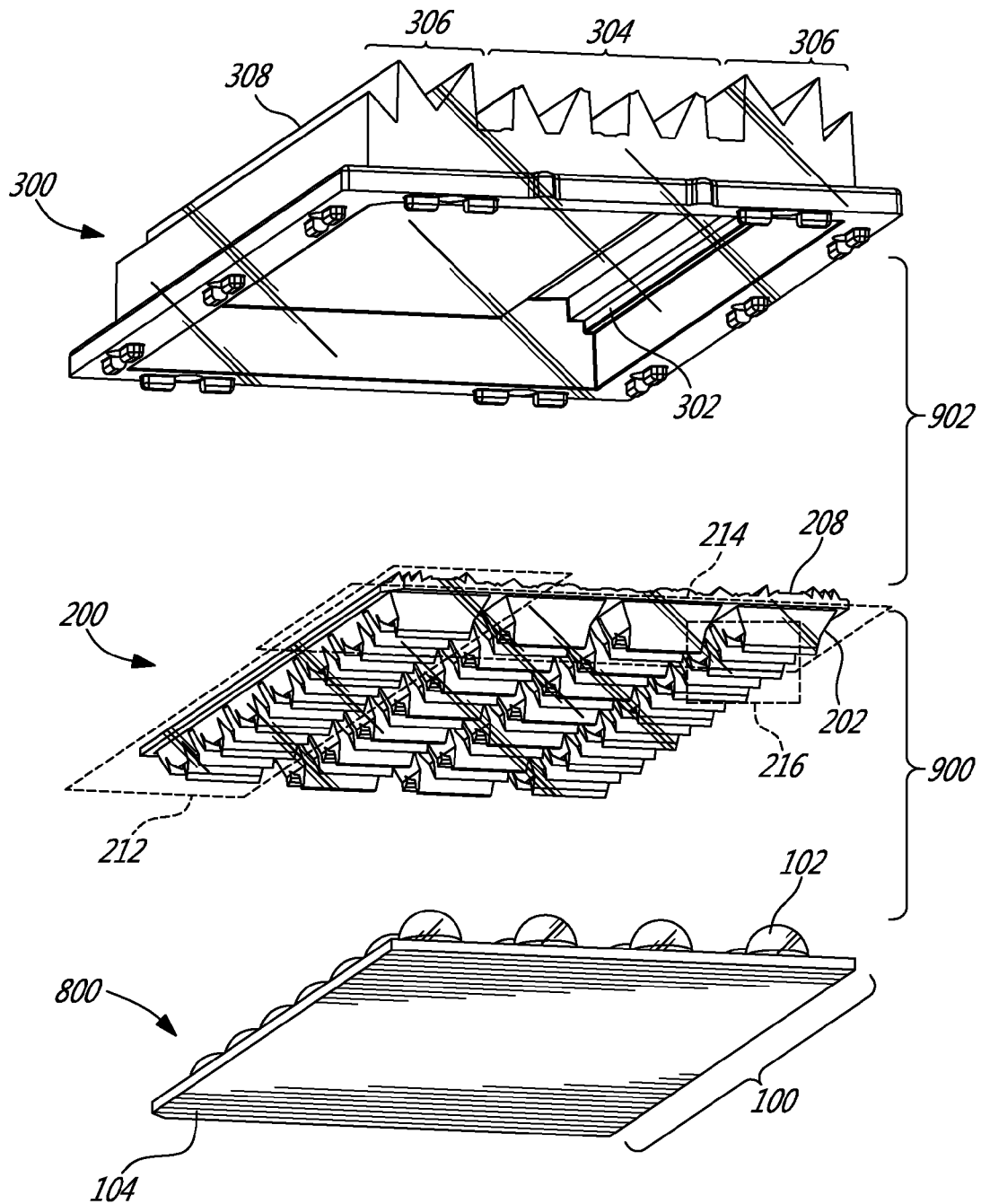
Fig_6B

LIGHT DISPERSION DEVICE

TECHNICAL FIELD

The present invention relates to LED-based lighting and, more specifically, to light dispersion devices.

BACKGROUND

A light-emitting diode (LED) transfers electric energy into photons by electroluminescence. A LED-based lighting solution, compared to conventional solutions, is usually more resistant to shock, has an extended lifetime under proper conditions and a better energy to photon ratio. LED-based lamps are different from conventional lamps, being usually brighter, but also likely to produce a narrower light beam. Improvements related to projecting light beams from LED-based lighting solutions become necessary in order to obtain a desired lighting effects therefrom.

The present invention addresses the above issue.

SUMMARY

A first aspect of the present invention is directed to a light dispersion device for producing a predictable lighting pattern. The light dispersion device comprises an LED source and a lens. The lens comprises a first optical element for collecting light emitted by the LED source and refracting light into an intermediate lighting pattern. The lens also comprises a second optical element for collecting at least light refracted in the intermediate lighting pattern and refracting light into the predictable lighting pattern. Optionally, the light dispersion device may have a first gap between the LED source and the first optical element and may have a second gap between the first optical element and the second optical element.

The intermediate lighting pattern may comprise a first angular range along a first axis and a first angular range along a second axis. The first angular range along the first axis may comprise a first sub-angular range along the first axis and a second sub-angular range along the first axis. The first angular range along the second axis may comprise a first sub-angular range along the second axis and a second sub-angular range along the second axis. The predictable lighting pattern may comprise the first angular range along the first axis and a second angular range along the second axis.

The first optical element may comprise two zones, e.g., on each face of the first optical element. Two zones of the first optical element may act on light emitted by the LED source. At least one of the two zones may refract light emitted by the LED source to produce the intermediate lighting pattern.

The second optical element may comprise two zones, e.g., on each face of the second optical element. The two zones may act on light refracted into the intermediate lighting pattern. One of these two zones may refract light refracted into the intermediate lighting pattern into the predictable lighting pattern.

At least one of the two zones of the first optical element may comprise two sub-zones. The first sub-zone of the first optical element may diffract light emitted by the LED source into both the first sub-angular range of the first angular range along the first axis and into the first sub-angular range of the first angular range along the second axis. The second sub-zone of the first optical element may diffract light emitted by the LED source both into the second sub-angular range of the first angular range along the first axis and into the second sub-angular range of the first angular range along the second axis.

At least one of the two zones of the second optical element may comprise two sub-zones. The first sub-zone of the second optical element may diffract light refracted into the intermediate lighting pattern into the first sub-angular range of the second angular range along the second axis. The second sub-zone of the second optical element may diffract light refracted into the intermediate lighting pattern into the second sub-angular range of the second angular range along the second axis.

The first angular range along the first axis may be between −10° and +50° along the first axis. The second angular range along the second axis may be between −70° and +70° along the second axis. Additionally, the first sub-zone of the first zone of the first optical element may collimate light emitted by the LED source. The second sub-zone of the first zone of the first optical element may concentrate light emitted by the LED source. Moreover, the first sub-angular range of the second angular range along the second axis may be between −70° and −50° and +50° and +70° along the second axis, and the second sub-angular range of the second angular range along the second axis may be between −50° and +50° along the second axis.

The LED source may be a single LED. Alternatively, the LED source may be an array of LEDs comprising N LEDs arranged in X columns and Y rows and wherein the first sub-zone of the first optical element and the second sub-zone of the first optical element are parallel to the columns in the array of LEDs. Additionally, the columns in the array of LEDs may be parallel to the first sub-zone of the second optical element and to the second sub-zone of the second optical element. The array of LEDs may comprise 28 LEDs arranged in 4 columns of 7 rows.

The first sub-zone of the first optical element and the second sub-zone of the first optical element may produce similar refracting patterns. The first sub-zone of the first optical element and the second sub-zone of the first optical element may alternatively produce different refracting patterns.

The first zone of the first optical element may comprise sub-zones refracting light emitted by the LED source into the first angular range along the first axis. The sub-zones may form an array of sub-zones arranged in rows and columns. The columns of sub-zones may be parallel to the columns of LEDs in the array of LEDs. Moreover, the first zone of the first optical element may comprise N sub-zones.

The first sub-zone of the second optical element and the second sub-zone of the second optical element may produce matching refracting patterns. The first sub-zone of the second optical element and the second sub-zone of the second optical element may produce different refracting patterns.

The LEDs may have a range for emitting light of 80 degrees. However, the LEDs may have a range for emitting light of 150 degrees.

A second aspect of the present invention is directed to a lens expected to be used, for instance, in a context similar to the light dispersion device described hereinabove with reference to the first aspect of the present invention. The lens comprises a first optical element which collects light and refracts light into an intermediate lighting pattern and a second optical element which collects at least light refracted into the intermediate lighting pattern and refracts light into a predictable lighting pattern. The lens may further comprise optional features matching the relevant optional features described with described with reference the light dispersion device of the first aspect of the present invention described hereinabove.

BRIEF DESCRIPTION OF THE DRAWINGS

A more complete understanding of the present invention may be obtained with particular reference to the detailed description when read in conjunction with the illustrative drawings, in which:

FIG. 5 is a side view of a second optical element of an exemplary light dispersion device in accordance with the teachings of the present invention.

FIG. 6B is an exploded perspective view from below of an exemplary light dispersion device in accordance with the teachings of the present invention.

DETAILED DESCRIPTION

Figure 1:
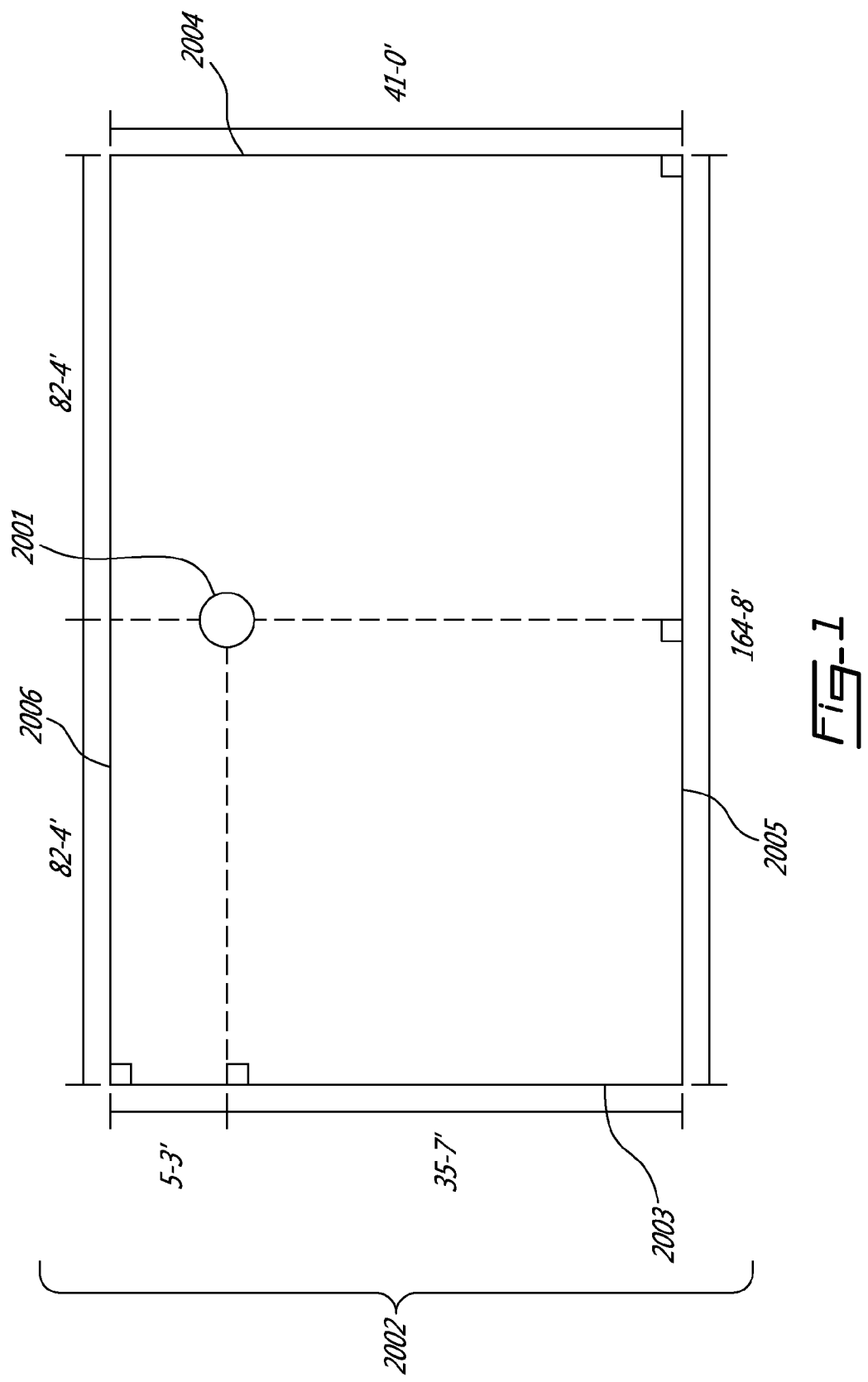
FIG. 1 is a top view of an exemplary light dispersion device projecting light into a predictable lighting pattern on the ground in accordance with the teachings of the present invention.

The present invention provides the exemplary advantage of focusing a beam of light, from a LED light source into a desired lighting pattern called a predictable lighting pattern. More specifically, the present invention addresses the exemplary issue of directing light uniformly in both a first angular range along a first axis, and in a second angular range along a second axis. In test performed, the use of a lens composed of one optical element could not provide a desired lighting pattern, e.g., with a different angular range along each of the two axes. The use of a lens composed of two optical elements becomes necessary in order to produce the predictable lighting pattern with two different angular ranges along the first and second axes. Each optical element contributes to dispersing light along one of the two axes. In order to produce the predictable lighting pattern, at least three active sides of the two optical elements, two sides of a first optical element and one side of a second optical element, are needed. The present invention also addresses, in test performed, the exemplary issue of providing a wide angular range of light (e.g. −70° to +70°)along an axis. In test performed, in some embodiments, the use of an optical element with one optically active structure on one of its sides did not produce a wide angular range of light with sufficient intensity. Therefore, this issue was addressed by providing an optical element, comprised in a lens, with at least two distinct optically active structures on one side (e.g. the second side) of the optical element (e.g. the second optical element). Each structure of the second optical element disperses light along a specific angular range. Summing the angular ranges of light produced by each structure present on the second side of the optical element produces the wide angular range.

The invention produces a predictable lighting pattern on the ground. The invention, a light dispersion device, comprises a lens and an LED light source. In an exemplary embodiment of the device, the LED light source is an array of LEDs. The solution for diffracting light, from e.g. an array of LEDs, is provided as the lens comprising a first optical element and a second optical element. Both optical elements show irregular surfaces shaped to contribute to the predictable lighting pattern. There may be a first gap separating the first optical element from the LED light source, and a second gap between the first optical element and the second optical element. The first element may be formed by an array of individual sub-zones, forming a joint or disjoint array. Both optical elements show multiple surface patterns (e.g. from the edges compared to the center).

In an exemplary embodiment of a light dispersion device, the exemplary device comprises a lens and an LED light source. The LED light source is an array of LEDs comprising 4 columns of 7 rows, comprising a total of 28 LEDs. The lens comprises a first optical element and a second optical element. The LED light source and the first optical element are separated by a first gap. In this example, the first optical element collects light on a first side and disperses light on a second side, opposite to the first side, into an intermediate lighting pattern. In the context of the present description, a side may comprise one or more zones. In this example, the collecting side of the first optical element comprises a matrix of sub-elements. Each sub-element of the matrix comprises a trapezoidal shape with multiple peaks. The collecting side comprises a matrix of 28 sub-elements. In this example, the second dispersing side comprises central columns with a first distinct shape and lateral columns with a second distinct shape. The lateral and central columns produce a different lighting pattern, where this difference is at least due to the distinct shapes of the lateral and central columns. The second distinct shape of the lateral columns applies Fresnel's principle which contributes to the desired intermediate lighting pattern. The central and lateral columns of the second dispersing side are parallel to the columns in the array of LEDs which facilitates the dispersion of light by the second optical element. The first optical element and the second optical element are separated by a second gap. In this same example, the second optical element collects light on a first side and disperses light on a second side, opposite to the first side. Light collected by the second optical element is the light dispersed into the intermediate lighting pattern. The light dispersed by the second optical element produces a predictable lighting pattern. In this example, the dispersing side of the second optical element comprises central columns with a first distinct prismatic shape and lateral columns with a second distinct prismatic shape in order to disperse light into complementary lighting patterns. The central columns and lateral columns of the second optical element are parallel.

The exemplary light dispersion device is designed for, but not limited to, illuminating parking lots, highways and municipal roads. The exemplary device may also be used in situations in which light may need to be directed into a specific direction (e g tunnels—to not blind drivers, bridges and streets). In these cases, the exemplary device, or any other light source, may be placed on a particular surface. An exemplary light dispersion device may then be used to illuminate in a desired direction. The exemplary device may also be used in large stadiums or other sporting areas. Other exemplary uses of the light dispersion device include indoor areas, such as hospitals, art galleries, concerts, theatres, arenas, etc. Due to a wide possible range of situations for the use of the exemplary light dispersion device, language used to qualify properties of the device will reflect an adaptability for these multiple uses.

The exemplary light dispersion device is designed to permit a distribution of light to be maintained even after one of the LEDs in a given array burns out. In accordance with one embodiment of the present invention, when an exemplary light dispersion device 2001 of FIG. 1 is placed at a height of 30.0°, the exemplary device 2001 produces a predictable lighting pattern that produces an area of rectangular shape 2002 which is illuminated within designed parameters. In this example, the light dispersion device 2001 is located above the area of rectangular shape 2002. The area of rectangular shape 2002 comprises a first edge 2003 and a second edge 2004, both edges 2003 and 2004 measuring 41'. The area of rectangular shape 2002 further comprises a third edge 2005 and a fourth edge 2006, both edges 2005 and 2006 measuring 164.8'. In this example, the first edge 2003 is parallel to the second edge 2004 and the third edge 2005 is parallel to the fourth edge 2006. A projection of the location of the exemplary device 2001 onto the area of rectangular shape 2002 is located at a distance of 5.3' from a mid-point of the fourth edge 2006. The projection of the location of the exemplary device onto the area of rectangular shape 2002 is located at a distance of 82.4' from the first edge 2003 following a line perpendicular to the first edge 2003.

One embodiment of the light dispersion device uses a Luxeon Rebel LXML-PWC1-0100, the lens' material is acrylic and the basic configuration of the lighting system array is a 4 by 7 LED matrix with a 19.5 mm spacing between each LED construct. In an exemplary embodiment of a light dispersion device, the energetic efficiency of the light dispersion device may be superior to 50%. The average luminescence of the light dispersion device is equal or greater than 4 LUX. The ratio of the average luminescence to the minimum luminescence is inferior to 6. In one exemplary embodiment of the light dispersion device 100, the first optical element 200 and the second optical element 300 are both made of an acrylic material. In an exemplary embodiment of the light dispersion device 100, the first optical element 200 and the second optical element 300 are both made of acrylic Plexiglas V825. In other exemplary embodiments, a person ordinarily skilled in the art will readily recognize that the lens 120 may be composed of other materials without affecting the invention (not shown).

The exemplary light dispersion device provides the exemplary advantage of directing light to a designated area, following a desired direction. The optical elements of the exemplary light dispersion device may have each of their thicknesses reduced in order to facilitate the molding of the plastic. In an exemplary embodiment of the light dispersion device 100, zones of both the first optical element 200 and the second optical element 300 are polished in selectively optically active portions.

Figure 2:
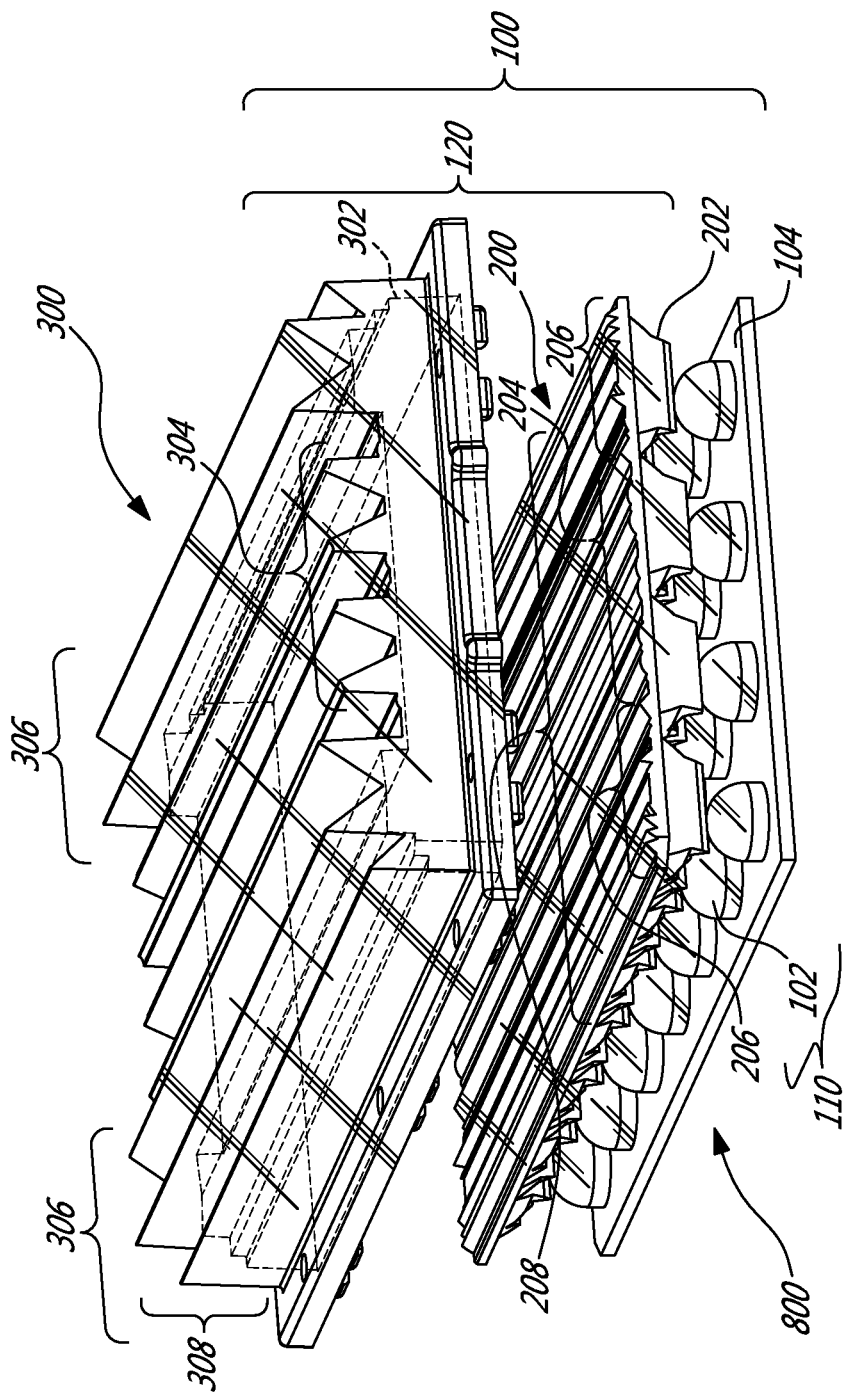
FIG. 2 is a perspective view of an exemplary light dispersion device in accordance with the teachings of the present invention.
Figure 3:
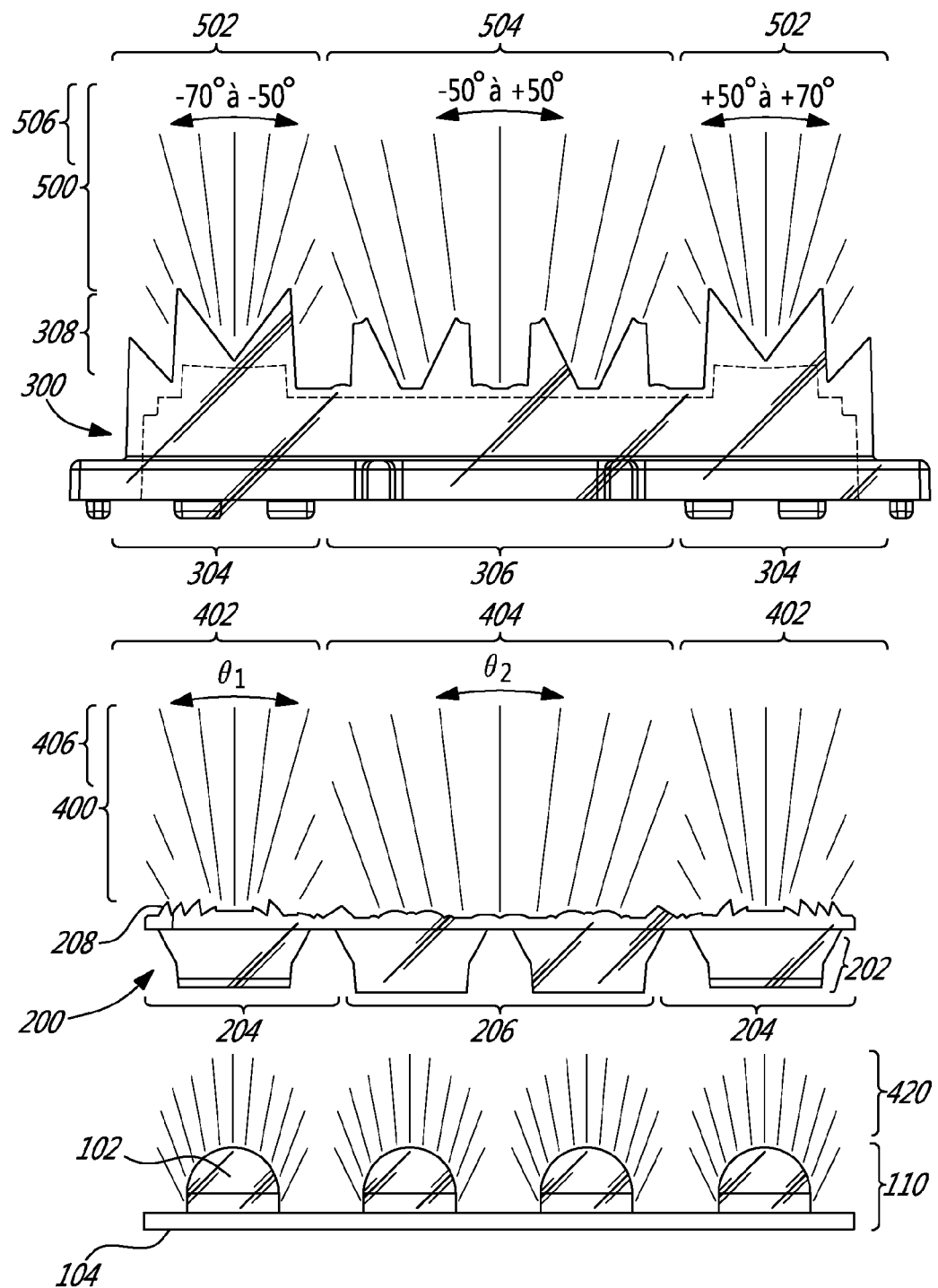
FIG. 3 is a front view of an exemplary light dispersion device in accordance with the teachings of the present invention.

Reference is now concurrently made to FIG. 2 and FIG. 3 of the drawings. FIG. 2 shows a perspective view of a light dispersion device 100 in accordance with the teachings of the present invention. FIG. 3 shows a front view of the light dispersion device 100. The LED source 110 emits light 420. The light dispersion device 100 provides a predictable lighting pattern 500. The light dispersion device 100 comprises an LED source 110 and a lens 120. In one exemplary embodiment, the LED source 110 is a single LED (shown in FIG. 7), which may be placed on a circuit board (shown in FIG. 7). In another exemplary embodiment, the LED source 110 is an array of LEDs 800, which may be placed on a circuit board (not shown on FIG. 2). In the case of the array of LEDs 800, there can be spacing in between each LED 102 as shown in FIG. 2 or barely any spacing between the LEDs 102 as they are located side by side (not shown). The lens 120 comprises two optical elements, a first optical element 200 and a second optical element 300.

In the exemplary light dispersion device 100, two optical elements (200 and 300) were used to reach the predictable lighting pattern 500. The first optical element 200 collects light emitted by the LED source 110 and refracts light into an intermediate lighting pattern 400. The second optical element 300 collects at least light refracted into the intermediate lighting pattern 400 and refracts light collected into the predictable lighting pattern 500. In the exemplary embodiment of FIG. 2, a person ordinarily skilled in the art will readily recognize that other shapes than that of a rectangular prism may be used for the first optical element 200 and the second optical element 300, without affecting the present invention. In other exemplary embodiments, a person ordinarily skilled in the art will readily recognize that the lens 120 may be composed of at least one additional optical element without affecting the invention (not shown).

The first optical element 200 comprises two zones, 202 and 208. A first zone 202 is on one face of the first optical element 200, and a second zone 208 is on the other face of the first optical element 200. Both zones 202 and 208 act with light emitted 420 by the LED source 110. The first zone 202 collects light emitted 420 by the LED source 110 and the second zone 208 refracts light into an intermediate pattern 400. In one exemplary embodiment of the light dispersion device 100, the first zone 202 collects light along two axes. A first axis represents the depth from the perspective of FIG. 3 (e.g., X-axis) and a second axis represents the width (e.g., Y-axis) and is therefore made visible in FIG. 3. The first zone 202 further refracts light into a first angular range 406 along the first axis as light passes through the first optical element 200. In the exemplary embodiment of the light dispersion device 100, the second zone 208 refracts collected light and produces an intermediate lighting pattern 400 in a first angular range 406 along the second axis. The second zone 208, of the first optical element 200 comprises a first sub-zone 204 and a second sub-zone 206. The first angular range along the second axis 406 comprises a first sub-angular range along the second axis 402 and a second sub-angular range along the second axis 404. The first sub-zone 204 refracts light emitted by the LED source 110 into the first sub-angular range 402 of the first angular range along the second axis 406. The second sub-zone 206 refracts light emitted by the LED source 110 a second sub-angular range 404 of the first angular range along the second axis 406.

A person ordinarily skilled in the art will readily recognize that the first zone 202 of the first optical element 200 could include more than two sub-zones, 204 and 206 without affecting the present invention (not shown). In the exemplary light dispersion device 100 of FIG. 2, the first axis is the X-axis and the second axis is the Y-axis. In the exemplary light dispersion device 100 of FIG. 3, the second sub-zone 206 is enclosed between two portions of the first sub-zone 204. The first and second sub-zones 204 and 206 together form the second zone 208. In the exemplary light dispersion device 100 of FIG. 3, the first sub-zone 204 collimates light emitted by the LED source 110. In the same exemplary light dispersion device 100, the second sub-zone 206 concentrates light emitted by the LED source 110.

The second optical element 300 as exemplified on FIG. 3 comprises a first zone 302, on one face of the second optical element 300, and a second zone 308, on another face of the second optical element 300. Both zones 302 and 308 act with light refracted into the intermediate lighting pattern 400. In some exemplary embodiments, the intermediate lighting pattern 400 may further be affected by other elements of the light dispersion device 100 (not shown) before reaching the second optical element 300.

The first zone 302 collects light refracted into the intermediate lighting pattern 400. The second zone 308 refracts collected light into the predictable lighting pattern 500. The predictable lighting pattern 500 comprises a first angular range along the first axis and a second angular range along the second axis 506. The first angular range along the first axis comprises a first sub-angular range along the first axis and a second sub-angular range along the first axis (not shown). The second angular range along the second axis 506 comprises a first sub-angular range along the second axis 502 and a second sub-angular range along the second axis 504. The second zone 308 comprises a first sub-zone 304 and a second sub-zone 306. The first sub-zone 304 refracts light into the first sub-angular range of the second angular range along the second axis 502. The second sub-zone 306 refracts light into the second sub-angular range of the second angular range along the second axis 504. A person ordinarily skilled in the art will readily recognize that the second zone 308 may comprise (not shown) more than two sub-zones 304 and 306 without affecting the present invention. Likewise, a person ordinarily skilled in the art will recognize that the first zone 302 of the second optical element 308 may comprise (not shown) at least one sub-zone without affecting the present invention. In the exemplary light dispersion device 100, the first zone 302 faces the first optical element 200. In the same exemplary light dispersion device 100, the second sub-zone 306 is enclosed between two portions of the first sub-zone 304. The first and second sub-zones 304 and 306 together form the second zone 308. In the same exemplary light dispersion device 100, the first sub-angular range 502 of the second angular range along the second axis of the predictable lighting pattern 500 is between −70° to −30° and +30° and +70° along the Y-axis. In the same exemplary light dispersion device 100, the second sub-angular range 504 of the second angular range along the second axis 506 of the predictable lighting pattern 500 is between −30° to +30° along the Y-axis. In another exemplary light dispersion device 100, the first sub-angular range 502 of the second angular range along the second axis of the predictable lighting pattern 500 is between −70° to −50° and +50° and +70° along the Y-axis. In the same exemplary light dispersion device 100, the second sub-angular range 504 of the second angular range along the second axis 506 of the predictable lighting pattern 500 is between −50° to +50° along the Y-axis.

Figure 4:
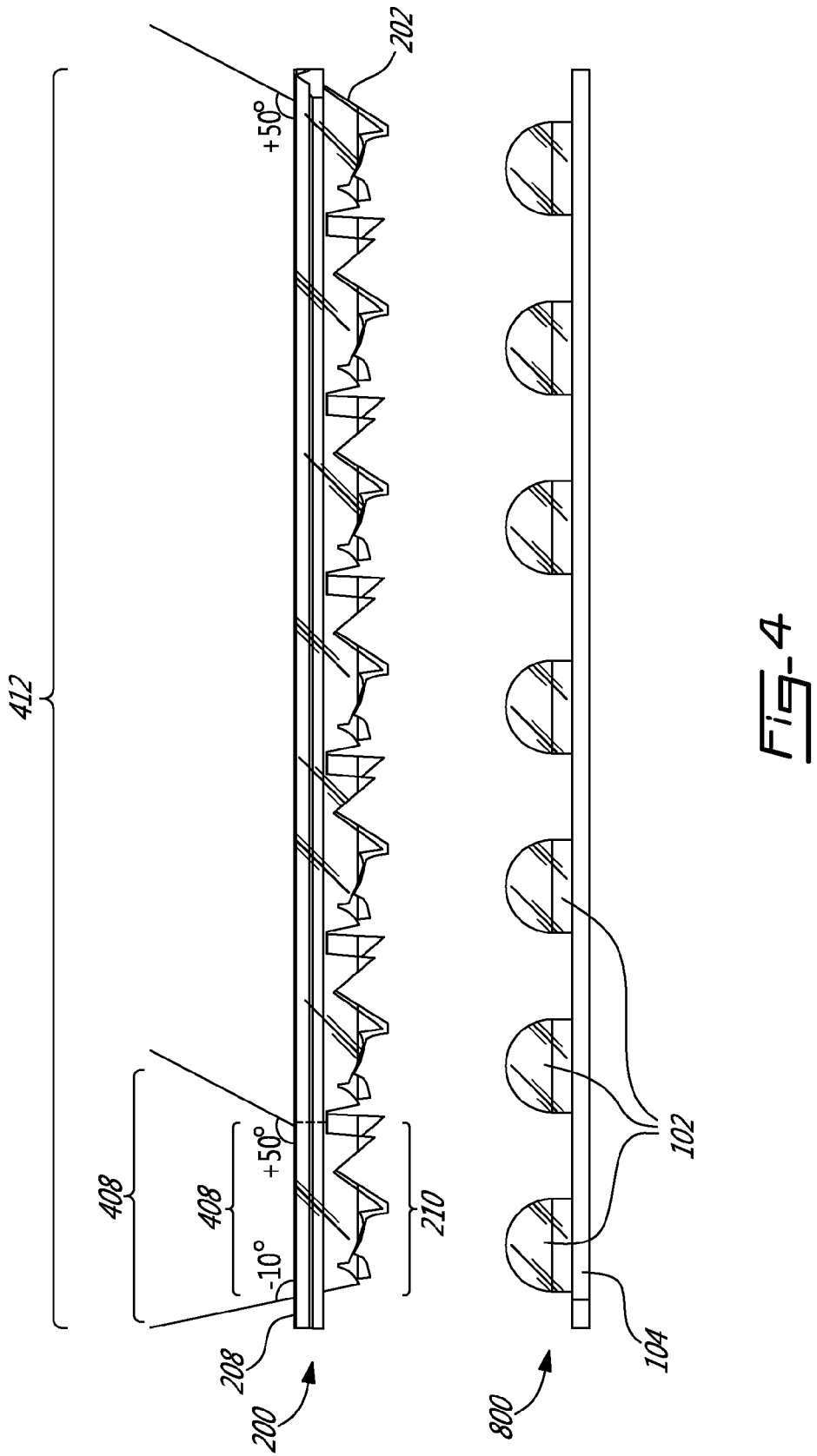
FIG. 4 is a side view of a first optical element of an exemplary light dispersion device in accordance with the teachings of the present invention.

FIG. 4 shows a side-view of the first optical element 200. In the exemplary embodiment of the light dispersion device 100, the array of LEDs 800 is composed of multiple LEDs 102 located below the first zone 202 of the first optical element 200. In the exemplary embodiment of the light dispersion device 100, the first optical element 200 comprises two zones. The first zone 202 collects and refracts light emitted by the LEDs and a second zone 208 refracts light into the intermediate lighting pattern. In the exemplary embodiment of the light dispersion device 100, the first zone 202 is composed of an array of sub-zones 210 in which the number of subzones 210 matches the number of LEDs 102 in the array of LEDs 800. In one exemplary embodiment of the light dispersion device 100, a person ordinarily skilled in the art will readily recognize that the number of sub-zones 210 may be more or less than the number of LEDs 102 in the array of LEDs 800 without affecting the invention. In the exemplary embodiment of the light dispersion device 100, each of the LEDs 102 is placed below a sub-zone 210 of the first zone 202. The first zone 202 refracts light, and thereafter, the light travels within the first optical element 200, producing a first angular range 408 in the intermediate lighting pattern 400 along the first axis 412. In the exemplary light dispersion device 100 as exemplified on FIG. 4, the first angular range 408 is between −10° and −50° along the X-axis.

FIG. 5 shows a side-view of the second optical element 300. In one exemplary embodiment of the light dispersion device 100 in FIG. 5, the first zone 302 collects light refracted into the intermediate lighting pattern 400. The second zone 308 refracts light into the predictable lighting pattern 500. In the exemplary embodiment of the light dispersion device 100 in FIG. 5, the angular range of light refracted in the X-axis, present in the intermediate lighting pattern 400 and still present in the predictable lighting pattern 500, is not meant to be affected by the second optical element 300. A person ordinarily skilled in the art will readily recognize that the second optical element 300 may further be acting on light refracted in the other axis (i.e., X-axis) without affecting the present invention.

Figure 6A:
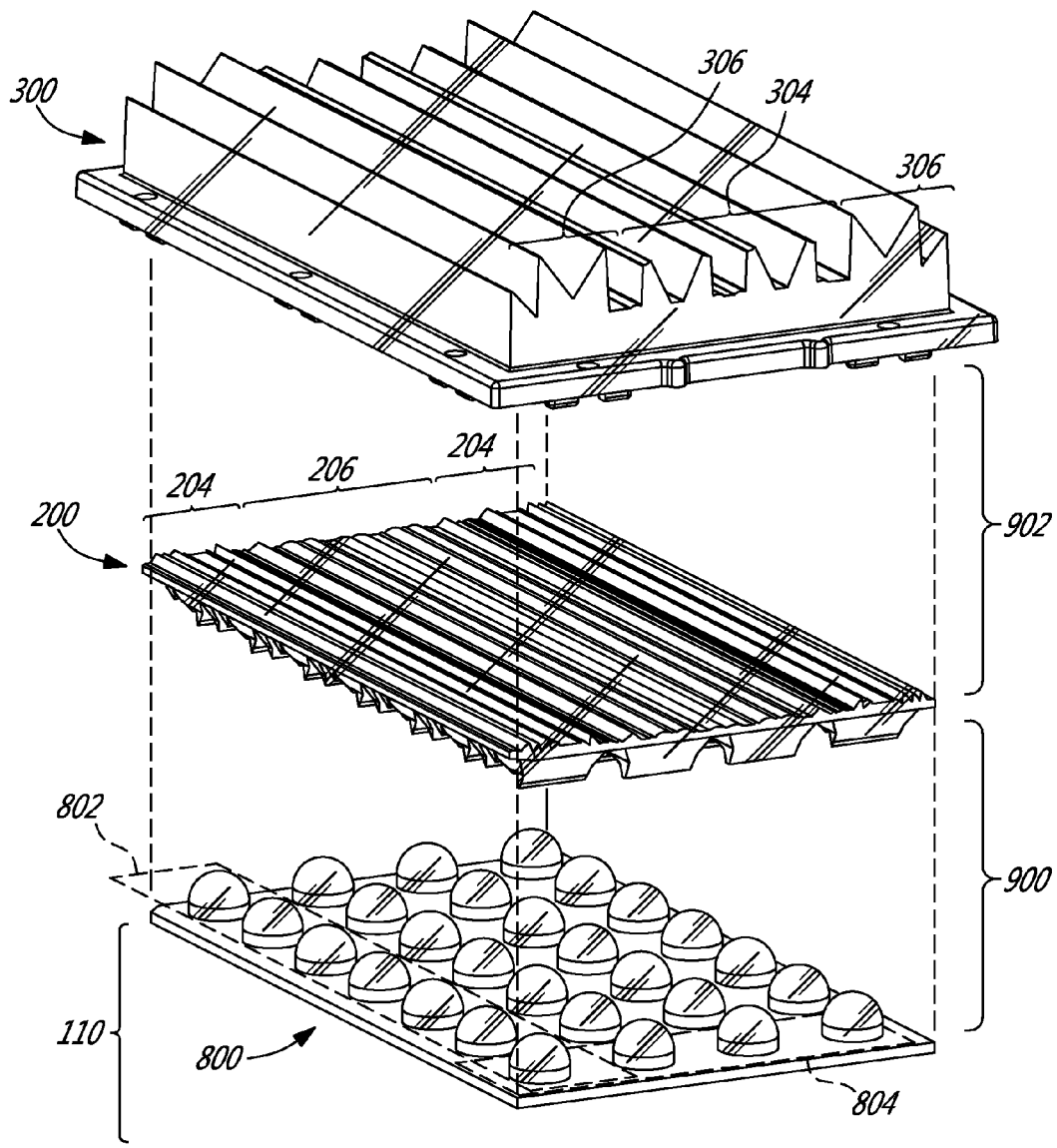
FIG. 6A is an exploded perspective view from above of an exemplary light dispersion device in accordance with the teachings of the present invention.

Reference is now concurrently made to FIGS. 6A and 6B referred to as FIG. 6. FIG. 6A and FIG. 6B show perspective exploded views respectively from above and from below of the exemplary light dispersion device 100. Once assembled (i.e., non-exploded), the light dispersion device 100 may have a first gap 900 in between the LED source 110 and the first optical element 200. In one exemplary embodiment of the light dispersion device 100, the gap 900 measured from the base of the LED to the lowest point of the first zone 202 is of 0.79 mm (not specifically shown). A person ordinarily skilled in the art will readily recognize that there may be no or little gap 900 between the LED source 110 and the first optical element 200 without affecting the invention (not shown).

The light dispersion device 100 of FIG. 6 may further present, once assembled, a second gap 902 in between the first optical element 200 and the second optical element 300. A person ordinarily skilled in the art will readily recognize that there may be no or little gap 902 in between the first optical element 200 and the second optical element 300 without affecting the present invention (not shown). The exemplary light dispersion device 100 shown in FIG. 6 presents the LED source 110 as the array of LEDs 800 comprising at least one column of LEDs 802 and at least one row of LEDs 804. In one exemplary embodiment of the light dispersion device 100, the array of LEDs 800 is composed of 4 columns 802 and 7 rows 804 of LEDs 102 as shown in FIG. 6. In one exemplary embodiment of the light dispersion device 100, the first sub-zone 204 of the second zone 208 or the first optical element 200 is parallel to the columns of LEDs 802 in the array of LEDs 800. In the exemplary embodiment of the light dispersion device 100 shown in FIG. 6, the second sub-zone 206 of the second zone 208 of the first optical element 200 is parallel to the columns of LEDs 802 in the array of LEDs 800. The exemplary light dispersion device 100 may comprise both the first sub-zone 204 and the second sub-zone 206 to produce a similar refracting pattern (not explicitly shown). In the exemplary embodiment of the light dispersion device 100, the first sub-zone 204 and the second sub-zone 206 produce different refracting patterns 402 and 404. The first sub-zone 304 of the second zone 308 of the second optical element 300 may be parallel to the columns of LEDs 802 in the array of LEDs 800. The second sub-zone 306 of the second zone 308 of the second optical element 300 may further be parallel to the columns of LEDs 802 in the array of LEDs 800. In one exemplary embodiment of the light dispersion device 100, both the first sub-zone 304 and the second sub-zone 306 produce a similar refracting pattern (not shown). In the exemplary light dispersion device 100, the first sub-zone 304 and the second sub-zone 306 produce different refracting patterns 502 and 504.

In the exemplary embodiment of the light dispersion device 100 in FIG. 6, the first zone 202 of the first optical element 200 comprises sub-zones 216 arranged in columns 212 and rows 214. In the same exemplary embodiment, the columns of sub-zones 212 are parallel to the columns of LEDs 802. The columns of sub-zones 212 are parallel to the columns of the first sub-zone 304 of the second zone 308 of the second optical element 300. The columns of sub-zones 212 are parallel to the columns of the second sub-zone 306 of the second zone 308 of the second optical element 300.

The number of sub-zones 216 may be equal to the number of LEDs 102. In a more specific exemplary embodiment of the light dispersion device 100, the sub-zones 216 are arranged in 4 columns 212 of 7 rows 214.

Figure 7:
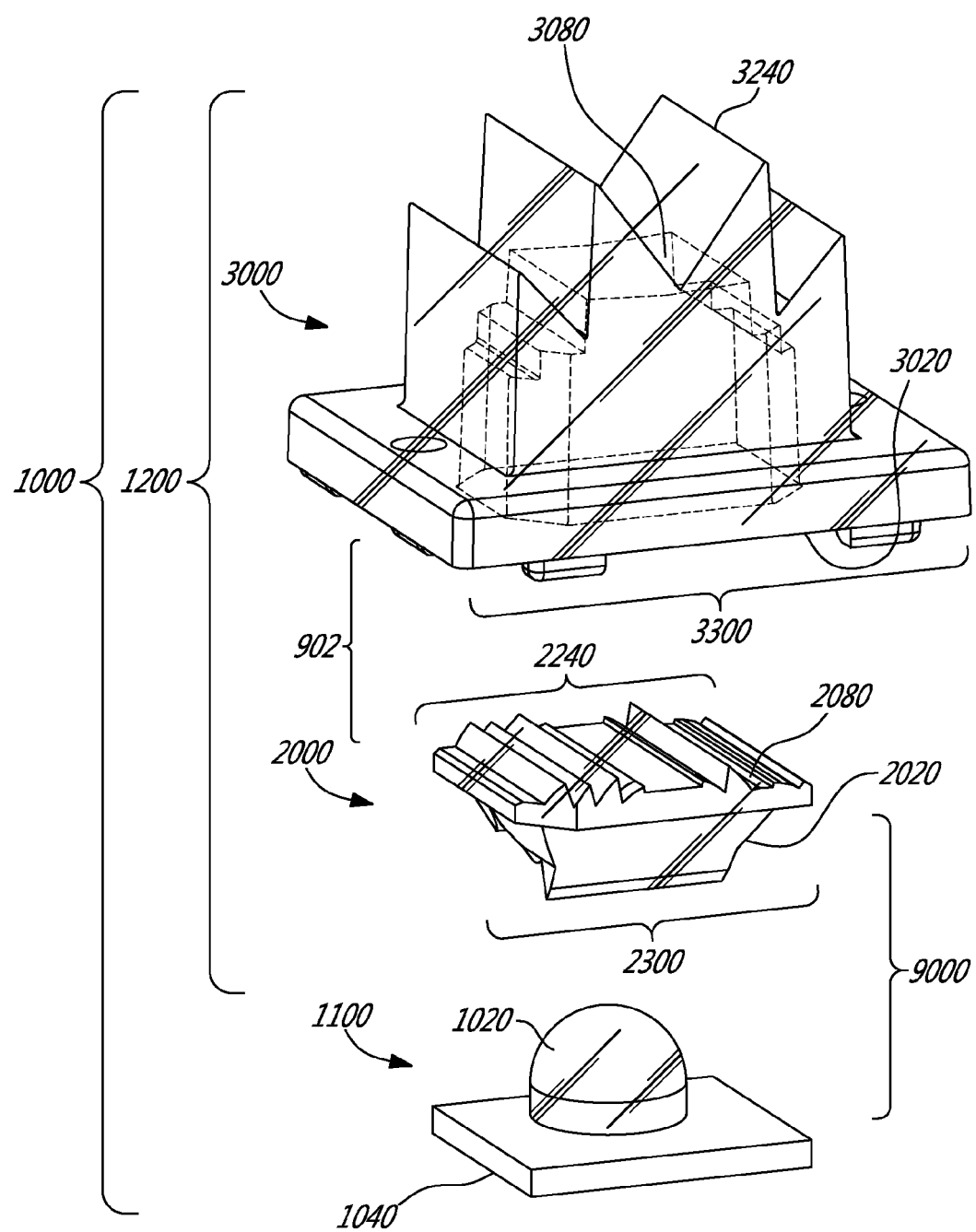
FIG. 7 is a perspective view of an exemplary light dispersion device in accordance with the teachings of the present invention.

FIG. 7 shows an exploded perspective view of an exemplary embodiment of a light dispersion device 1000 comprising a LED source 1100 comprising a single LED 1020. In the exemplary embodiment of the light dispersion device 1000, the single LED 1020 is placed on a circuit board 1040. In another exemplary embodiment, a person ordinarily skilled in the art will readily recognize that the single LED 1020 may not be placed on a circuit board without affecting the invention (not shown). The lens 1200 comprises a first optical element 2000 collecting light form the LED source 1100 and refracting light into an intermediate lighting pattern (not shown) and a second optical element 3000 collecting light refracted into the intermediate lighting pattern and refracting light into a predictable lighting pattern (not shown). The first optical element 2000 comprises a first zone 2020 on one face of the first optical element 2000 and a second zone 2080 on the other face of the first optical element 2000, the first zone 2020 and the second zone 2080 both acting with light emitted by the LED source 1100. In one exemplary embodiment of the light dispersion device 1000, the first zone 2020 comprises one sub-zone 2240 producing a first angular range (not shown) along a first axis. A person ordinarily skilled in the art will readily recognize that the second zone 2080 may also comprise one sub-zone 2300 interacting with light emitted by the LED source 1100 without affecting the invention. In the same exemplary embodiment of the light dispersion device 1000, the second optical element 3000 comprises a first zone 3020 on one face of the second optical element 3000 and a second zone 3080 on the other face of the second optical element 3000, the first zone 3020 and the second zone 3080 acting with light. The second zone 3080 may comprise one sub-zone 3240 producing the predictable lighting pattern. A person ordinarily skilled in the art will readily recognize that the first zone 3020 may also comprise one sub-zone 3300 interacting with light emitted by the LED source 1100 without affecting the present invention. In a non-exploded view (not shown) of the light dispersion device of FIG. 7, there may be a first gap 9000 between the LED source 1100 and the first optical element 2000. A person ordinarily skilled in the art will readily recognize that there may be no or little gap 9000 between the LED source 1100 and the first optical element 2000 without affecting the present invention. In a non-exploded exemplary embodiment of the light dispersion device 1000 of FIG. 7, there may be a second gap 9020 between the first optical element 2000 and the second optical element 3000. A person ordinarily skilled in the art will readily recognize that there may be no or little gap 9020 between the first optical element 2000 and the second optical element 3000 without affecting the present invention.

In the exemplary embodiment of the light dispersion device 100, a holding device (not shown) may be placed around both optical elements 200 and 300. The holding device may be provided to secure the first and second optical elements 200 and 300, and/or to prevent wear by reducing rubbing between both optical elements 200 and 300. In one exemplary embodiment, the holding device is placed alongside the rim of the second optical element 300 and pushes down on the first optical element 200. The holding device may be composed of rubber.

In the exemplary embodiment of the light dispersion device 100, the distance separating the base of an LED 102 and the lowest region of the first zone of the second optical element is of 10.91 mm.

LEDs used in the exemplary light dispersion devices which are expected to function effectively to produce a light beam of desired characteristics emit light with an angular range between 80 to 150 degrees. The LED may, for instance, be a 80 degree Oslon LED from Osram, or a Luxeon Rebel LXML-PWC1-0100 or 0120 DS64.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A light dispersion device for providing a predictable lighting pattern comprising:
 a Light Emitting Diode (LED) source that is an array of Light Emitting Diodes (LEDs) comprising N Light Emitting Diodes (LEDs) arranged in X rows and Y columns;
 a lens comprising:
  a first optical element for collecting light emitted by the Light Emitting Diode (LED) source and refracting light into an intermediate lighting pattern, the intermediate lighting pattern comprising:
   light refracted according to a first angular range along a first axis; and
   light refracted according to a first angular range along a second axis perpendicular to the first axis, comprising:
    a first sub-angular range along the second axis; and
    a second sub-angular range along the second axis, wherein the first optical element comprises two zones, wherein a first zone, on one face of the first optical element, and a second zone, on an opposing face of the first optical element both act on light emitted by the Light Emitting Diode (LED) source, at least one of the two zones of the first optical element being adapted to refract light emitted by the Light Emitting Diode (LED) source to produce the intermediate lighting pattern;
   wherein the first zone of the first optical element comprises sub-zones refracting light emitted by the Light Emitting Diode (LED) source into the first angular range along the first axis, the sub-zones forming an array of sub-zones arranged in rows and columns, and wherein the columns of sub-zones are parallel to the columns of Light Emitting Diodes (LEDs) in the array of Light Emitting Diodes (LEDs); and a second optical element for collecting at least light refracted in the intermediate lighting pattern and refracting light into the predictable lighting pattern, the predictable lighting pattern comprising:
light propagated according to the first angular range the first axis; and
light propagated according to a second angular range along the second axis, comprising:
a first sub-angular range along the second axis; and
a second sub-angular range along the second axis,
wherein the second optical element comprises two zones, wherein a first zone, on one face of the second optical element, and a second zone, on an opposing face of the second optical element both act on light refracted into the intermediate lighting pattern, at least one of the two zones of the second optical element being adapted to refract light refracted into the intermediate lighting pattern to produce the predictable lighting pattern.

2. A light dispersion device for providing a predictable lighting pattern comprising:
a Light Emitting Diode (LED) source that is an array of Light Emitting Diodes (LEDs) comprising N Light Emitting Diodes (LEDs) arranged in X rows and Y columns;
a lens comprising:
a first optical element for collecting light emitted by the Light Emitting Diode (LED) source and refracting light into an intermediate lighting pattern,
wherein the first optical element comprises:
two zones, wherein a first zone, on one face of the first optical element, and a second zone, on an opposing face of the first optical element both act on light emitted by the Light Emitting Diode (LED) source;
wherein at least one of the two zones of the first optical element is adapted to refract light emitted by the Light Emitting Diode (LED) source to produce an intermediate lighting pattern, the intermediate lighting pattern comprising:
a first angular range along a first axis comprising:
a first sub-angular range along the first axis, and
a second angular range along the first axis; and
a first angular range along a second axis comprising:
a first sub-angular range along the second axis, and
a second sub-angular range along the second axis;
wherein at least one of the two zones comprises:
a first sub-zone refracting light emitted by the Light Emitting Diode (LED) source into both the first sub-angular range of the first angular range along the first axis and the first sub-angular range of the first angular range along the second axis; and
a second sub-zone refracting light emitted by the Light Emitting Diode (LED) source into both the second sub-angular range of the first angular range along the first axis and the first sub-angular range of the first angular range along the second axis; and
a second optical element for collecting at least light refracted in the intermediate lighting pattern and refracting light into the predictable lighting pattern.

3. The light dispersion device of claim 2, wherein the first sub-zone of the second zone of the first optical element and the second sub-zone of the second zone of the first optical element comprises Y columns corresponding to the columns of the array of LEDs.

4. A lens for providing a predictable lighting pattern comprising:
a first optical element for collecting light and refracting light into an intermediate lighting pattern, wherein the first optical element comprises:
two zones, wherein a first zone, on one face of the first optical element, and a second zone, on an opposing face of the first optical element both act on light emitted by a Light Emitting Diode (LED) source;
wherein at least one of the two zones of the first optical element is adapted to refract light collected in order to produce an intermediate lighting pattern, the intermediate lighting pattern comprising:
a first angular range along a first axis comprising:
a first sub-angular range along the first axis, and
a second angular range along the first axis; and
a first angular range along a second axis comprising
a first sub-angular range along the second axis, and
a second sub-angular range along the second axis;
wherein at least one of the two zones comprises:
a first sub-zone refracting light emitted by the Light Emitting Diode (LED) source into both the first sub-angular range of the first angular range along the first axis and the first sub-angular range of the first angular range along the second axis, and
a second sub-zone refracting light emitted by the Light Emitting Diode (LED) source into both the second sub-angular range of the first angular range along the first axis and the first sub-angular range of the first angular range along the second axis; and
a second optical element for collecting at least light refracted in the intermediate lighting pattern and refracting light into the predictable lighting pattern.

* * * * *